United States Patent Office 3,006,872
Patented Oct. 31, 1961

3,006,872
COAGULATION OF DISPERSED POLYMERIC ORGANIC MATERIAL WITH POLY(ETHYLENE OXIDE), AND PRODUCT THEREOF
Donald B. Benedict, Chappaqua, N.Y., and David Q. White, South Charleston, W. Va., assignors to Union Carbide Corporation, a corporation of New York
No Drawing. Filed Oct. 28, 1957, Ser. No. 692,520
13 Claims. (Cl. 260—3)

This invention relates to the coagulation of a liquid suspension of polymeric organic material. In one aspect this invention relates to a coagulable aqueous dispersion of polymeric organic material and a coagulating amount of poly(ethylene oxide) hereinafter described. In another aspect this invention relates to rubber latex compositions which are heat-sensitized with poly(ethylene oxide) hereinafter described.

In the production of natural rubber, a primary step after obtaining the milky-white latex from the tree Hevea brasiliensis is that of treating the fluid latex to recover its rubber content. In one conventional method, the separation technique has been accomplished by first diluting the latex to a predetermined concentration, using water, and thereafter treating the resulting diluted latex product with substances which have the effect of coagulating the rubber particles contained in the latex. Among the more common coagulants employed are inorganic acids, e.g., hydrochloric acid and sulfuric acid; organic acids such as formic, oxalic and acetic acids; solutions of zinc salts, and others. A subsequent step involves the decantation of the supernatant liquid to recover the coagulum.

The technique of emulsion polymerization is a commonly employed commercial route in the preparation of synthetic rubbers, synthetic fibers, and the like. Emulsion polymerization is more rapid and easier to control than mass polymerization, and the emulsion polymerization route lends itself well to the incorporation of various modifying agents. In the copolymerization of, for example, butadiene and styrene to manufacture synthetic rubber, the monomers are copolymerized in the presence of a soap solution, e.g., sodium stearate, a modifier, e.g., dodecyl mercaptan, and an aqueous catalyst solution such as potassium persulfate in an aqueous medium. When the desired degree of conversion has been reached, a shortstop such as hydroquinone, sodium sulfide or various dialkyldithiocarbamates, can be added. The unreacted monomers are subsequently recovered from the emulsion system, and an antioxidant, e.g., phenyl-beta-naphthylamine, may be added. The aqueous emulsion of copolymers generally is then creamed by the addition thereto of brine, and coagulated by the addition of acid. The system comprising coagulum and serum are further treated to the point where the raw rubber product is baled for future use or shipment.

Emulsion polymerization is oftentimes employed to produce polymers useful in the plastics and synthetic fiber fields. For example, it has been proposed to copolymerize styrene and acrylonitrile in the presence of an aqueous solution containing alkyl benzene sulfonate and potassium persulfate. Upon termination of the polymerization reaction the resulting emulsion was poured into a large quantity of ethanol thereby resulting in the precipitation of the polymer. U.S. Patent No. 2,420,330 teaches the conjoint emulsion polymerization of vinyl chloride and acrylonitrile in the presence of water, catalyst and emulsifying agent. The resulting resin suspension or hydrosol can be broken by adding an equal volume of a solvent, such as acetone, agitating the suspension, and permitting the coagulated resin to settle. Coagulation can be further facilitated by the addition of ionic solution, such as salt or acid solutions.

It has also been proposed to prepare natural and synthetic rubber latices which have been rendered heat-sensitive by the addition of inorganic and organic compounds. In the heat-sensitized latex process, an impermeable hot mold is dipped into the heat-sensitized latex, the temperature of the mold being above the coagulation point of the latex. The mold is held in the latex until a coagulum of desired thickness forms about the mold; the mold is then withdrawn from the latex, dried, washed in water, dried again, and cured. The heat-sensitized latices can also be poured into molds which are subsequently heated to coagulate the latex. Several other uses are also recognized for heat-sensitized latices.

Illustrative heat-sensitizers proposed by the prior art include various soluble, inorganic bivalent and trivalent metal salts, mixture of an ammonium salt of a strong acid and zinc oxide, trimethyl cellulose, nitroparaffins containing up to six carbon atoms, polyalkoxy-substituted-alkanols, and others. Generally, before a latex is rendered heat-sensitized the various compounding ingredients are incorporated therein such as, vulcanizing agents, fillers, pigments, activators, stabilizers, and the like.

The present invention contemplates the coagulation of a liquid suspension of polymeric organic material by incorporating therein a coagulating amount of poly(ethylene oxide) which has a reduced viscosity in acetonitrile of at least 1.0 and upwards to 75, and higher. The poly(ethylene oxides) employed are solid, colorless, water-soluble compounds. They appear to form homogeneous systems in water in all proportions, although the relatively high molecular weight ethylene oxide polymers merely swell on the addition of small amounts of water. On the addition of greater amounts of water, the polymers pass into solution. The water solutions are viscous, the viscosity increasing both with the concentration of the polymer in the solution and the reduced viscosity of the polymer. The ethylene oxide polymers employed in this invention show little change in melting point with increased reduced viscosity (an indication of increased molecular weight) and the melting point, as measured by change in stiffness with temperature, was found to be about 65°±2° C. throughout the range of reduced viscosities of from about 1.0 to about 10, and greater. These polymers, upon X-ray examination, show the sort of crystallinity exhibited by polyethylene. The crystallization temperature, as determined from measuring the break in the cooling curve, is about 55° C. The polymers of ethylene oxide possessing a reduced viscosity of at least 1.0 are hard, tough, horney, water-soluble materials.

As will be shown hereinafter various modifications and embodiments of the instant invention can be practiced. For instance, a coagulable composition comprising dispersed polymeric organic material in a liquid medium can be prepared which can be coagulated under controlled conditions of, for example, temperature and/or pH. Such coagulable compositions have utility in the molding and dipping art. In another embodiment a synthetic latex such as obtained by the emulsion polymerization of vinyl chloride and acrylonitrile (note U.S. Patent No. 2,420,330), the use of poly(ethylene oxide), described previously, serves not only to coagulate to polymer suspension, but also, the color of the polymer during the hardening step is markedly improved. In the manufacture of molded plastics and synthetic fibers the color of the resulting article or fiber can well determine its salability.

Accordingly, one or more of the following objects will be achieved by the practice of this invention.

It is an object of this invention to provide a novel process for coagulating a coagulable dispension of polymeric organic material in a liquid medium with a coagulating amount of poly(ethylene oxide). It is another object of this invention to provide a novel process for coagulating natural and synthetic latices with a coagulating amount of poly(ethylene oxide). A further object of this invention is to provide a novel coagulable composition comprising a suspension of polymeric organic material and poly(ethylene oxide). A still further object of this invention is to provide novel heat-sensitized latices which are particularly adaptable for the production of molded or dipped articles. A yet further object of this invention is to provide a novel process for coagulating an emulsion comprising vinyl chloride/acrylonitrile copolymer with poly(ethylene oxide), the resulting coagulum after being subjected to a hardening step exhibiting markedly improved color characteristics. These and other objects will become apparent to those skilled in the art from a consideration of the instant specification.

The understanding and practice of the instant invention will be greatly facilitated by defining various terms which will be referred to hereinafter.

By the term "reduced viscosity," as used herein, is meant a value obtained by dividing the specific viscosity by the concentration of the ethylene oxide polymer in the solution, the concentration being measured in grams of polymer per 100 milliliters of solvent at a given temperature, and is regarded as a measure of molecular weight. The specific viscosity is obtained by dividing the difference between the viscosity of the solution and the viscosity of the solvent by the viscosity of the solvent. The reduced viscosities herein referred to are measured at a concentration of 0.2 gram of poly(ethylene oxide) in 100 milliliters of acetonitrile at 30° C.

By the term "intrinsic viscosity" is means the value at zero concentration of the reduced viscosity concentration curve. In other words, intrinsic viscosity is, in effect, the reduced viscosity extrapolated to the zero concentration of polymer solution.

The term "aqueous bulk viscosity," as used herein, refers to the viscosity of the stated concentration of polymer in water, as measured at two revolutions per minute (unless otherwise indicated) on a Model RVF Brookfield Viscometer at ambient room temperature, i.e., about 24° C. to about 27° C. As the reduced viscosity increases over a range of from above about 1.0 upwards to 60, and higher, the aqueous bulk viscosity, on the average, will increase. The term is an indication of the molecular weight.

The term "bulk polymerization process" refers to polymerization in the absence of an organic medium or diluent. The term "solution polymerization" refers to polymerization in the presence of an organic medium or diluent in which both the monomer employed and the polymer produced are soluble. The term "suspension polymerization process" refers to polymerization in the presence of an organic medium in which the monomer employed is soluble and the polymer produced is insoluble.

By the terms "coagulating amount" and "heat-sensitizing amount," as used herein, are meant that quantity of poly(ethylene oxide) which when added to a system comprising a coagulable dispersion, suspension, emulsion, or the like of polymeric organic material in a liquid medium, is sufficient to coagulate said polymeric material, or to render said system heat-sensitized. The amount of poly(ethylene oxide) necessary to coagulate or heat-sensitize these systems is governed, to an extent, on the reduced viscosity of the poly(ethylene oxide), on the components comprising the system such as polymeric material and other ingredients, e.g., catalyst, modifier, activator, stabilizer, antioxidant, and/or filter, the pH factor, and other consideration. The art is well apprised of the technique of coagulating or heat-sensitizing, for example, natural and synthetic latices, and the amount of poly(ethylene ovide) employed will be determined by the optimum conditions desired or the particular field of uses contemplated.

Alkylene oxide polymers such as poly(ethylene oxide), poly(propylene oxide), poly(butylene oxide) and the like which have a reduced viscosity in the range from about 1.0 to about 60, and higher, can be prepared by polymerizing alkylene oxide in contact with certain metal carbonate catalysts, such as, for example, calcium carbonate, barium carbonate, strontium carbonate and others. These metal carbonate catalysts are advantageously employed in concentrations in the range from about 0.3 to 3 parts by weight per 100 parts by weight of alkylene oxide. The polymerization reaction can be conducted in the liquid phase at a temperature in the range from about 70° to about 150° C. It is preferred that the metal carbonate catalyst contain not more than one part by weight of non-sorbed water per 100 parts by weight of monomer, and at least 0.01 part by weight of sorbed water per 100 parts by weight of catalyst. It is further preferred that the carbonate catalyst be free from ions which reduced their catalytic activity such as, for example, chlorate and thiosulfate ions.

Granular poly(ethylene oxide) having a reduced viscosity in acetonitrile in the range from about 1.0 to about 60, and higher, can be prepared by polymerizing ethylene oxide in contact with about 0.2 to about 10 parts by weight, per 100 parts by weight of monomer, of a catalyst such as the alkaline earth metal amides, hexammoniates, or the decomposition products of hexammoniates. The polymerization reaction is preferably conducted at a temperature in the range from about 0° to 70° C. and is carried out in the presence of a liquid organic medium such as the normally liquid straight and branch chain saturated hydrocarbons, cyclic and alkyl-substituted cyclic saturated hydrocarbons and the like, e.g., heptane, methylcyclopentane, etc., in which ethylene oxide is soluble and the poly(ethylene oxide) is insoluble. Agitation of the reaction mixture during the polymerization results in the production of granular ethylene oxide polymer having a reduced viscosity in acetonitrile above about 1.0, and generally above about 30 and up to 60, and higher. The granular poly(ethylene oxide) can be recovered from the reaction mixture by decanting the organic medium and vacuum drying the ethylene oxide polymer. The poly(ethylene oxide) is obtained in a granular state.

The natural rubber latex employed, that is, coagulated or rendered heat-sensitized, can be purified, creamed, centrifuged, evaporated, or crude, such as from the Hevea brasiliensis. The natural rubber latex can be treated beforehand, if desired, to reduce the ammonia content therein. The instant invention also contemplates coagulating or heat sensitizing synthetic rubber latices such as emulsions of polymerization products of 1,3-butadiene, styrene, chloroprene, and the like; mixtures of 1,3-butadiene with other copolymerizable olefins and diolefins such as isobutylene, styrene, 2,4-hexadiene, alpha-methylene carboxylic acids and their esters, nitriles, amides, and the like. Emulsions of polyacrylonitrile, polyvinyl chloride, etc., or copolymers of acrylonitrile with vinyl chloride, vinyl esters of aliphatic monocarboxylic acid such as vinyl acetate and vinyl propionate, alkyl esters of methacrylic and acrylic acids such as methyl methacrylate, ethyl methacrylate, and methyl acrylate, vinyl-substituted hydrocarbons such as styrene, divinylbenzene, and the like, vinylidene chloride, methacrylonitrile, 2-methallyl alcohol, N-allyl ureas, N-2-methallyl ureas, and others, are systems amenable to being coagulated or heat-sensitized according to the practice of this invention.

In preparing heat-sensitizing latices, such as a natural latex having a basic pH, it is the common practice to prepare a dispersion of the various compounding agents, and add this dispersion to the latex. The vulcanizing dispersion can comprise those ingredients well-recognized in the art and include, for example, plasticizers, e.g., petroleum asphalts, heavy coal-tar fractions, etc.; vulcanizers, e.g., sulfur, tellurium, etc.; accelerators, e.g., thiuram sulfides and various dithiocarbamates, such as zinc diethyldithiocarbamate; reinforcing pigments, e.g., carbon black; antioxidants, e.g., phenyl-beta-naphthylamine, ditertiary-butylhydroquinone; and other compounding ingredients. As a practical matter the only limitation is that the compounding ingredients do not cause coagulation of the latex when they are added.

In the practice of this embodiment of the invention, it is preferred to incorporate into the natural rubber latex, prior to the addition of poly(ethylene oxide) thereto, a stabilizing agent to thus prevent coagulation of the latex upon the addition of acid. By this expedient, premature coagulation is prevented when the pH is lowered within the basic pH range, e.g., to about 7.2, and lower.

Several well-recognized rubber latex stabilizers can be employed. As an illustration the stabilizers can be the alkylphenoxypolyoxyethyleneethanols, condensation products of an alkylnaphthol with ethylene oxide, reaction product of ethylene oxide and oleyl alcohol, and others. These and other stabilizers are well-recognized to the rubber art and their preparation is extensively discussed in the literature. In general, up to about 5 weight percent of stabilizing agent, based on the weight of the polymeric material is satisfactory; from about 0.5 to about 2.0 weight percent of stabilizing agent, based on the weight of polymeric material, is preferred. It is pointed out that an excessive quantity of stabilizer can result in over-stabilizing the latex such that coagulation about a hot mold or form dipped in said latex will fail to occur.

After the compounding ingredients have been added (including the stabilizing agent) a heat-sensitizing amount of poly(ethylene oxide) is then incorporated into the latex containing said compounding ingredients. In general, a concentration of from about 0.1, or lower, to about 2.5 weight percent, and higher, of poly(ethylene oxide), based on the weight of polymeric material, is sufficient. It is observed that the higher the reduced viscosity value of the poly(ethylene oxide) the lower, in general, the quantity of poly(ethylene oxide) needed to effect the coagulation of the latex or to render the latex heat-sensitized. It is also to be noted that an extremely basic latex (containing the compounding ingredients) is difficult to heat sensitized; however, as the pH of the latex is lowered from its original value to a substantially neutral pH value by the addition of acid, e.g., sulfuric acid, acetic acid, oxalic acid, and the like, the temperature of the coagulation point and stability of said latex is decreased.

A typical recipe which can be heat-sensitized is as follows:

RECIPE I

| | |
|---|---|
| Natural rubber latex [1] | 200 |
| Vulcanizing dispersion | 12.2 |
| Poly(ethylene oxide) | 2.4 |

Vulcanizing dispersion ingredients:

| | |
|---|---|
| Di-beta-naphthyl-p-phenylenediamine | 1.2 |
| Zinc dibutyldithiocarbamate | 1.2 |
| Sulfur | 0.7 |
| Tellurium | 0.6 |
| Sulfonated petroleum product | 0.24 |
| Zinc oxide | 2.4 |
| Water | 5.5 |
| Stabilizers (casein and NaOH) | 0.3 |

[1] 58 percent solids, partially de-ammoniated.

The heat-sensitized latex mixture can be maintained at room temperature for several hours without coagulation being manifest. However, heating the heat-sensitized latex at a temperature in the range of from about 35° C. to about 125° C., and higher, results in coagulation of said latex. It will also be noted that a molded form can be inserted into the heat-sensitized latex and by applying sufficient heat to said mold a layer of coagulum forms on said mold. The mold is subsequently removed from the latex, washed, dried, and cured.

Another embodiment of this invention concerns the coagulation of synthetic latices prepared by the emulsion polymerization route. For example, synthetic rubber can be prepared by the emulsion copolymerization of butadiene and styrene in the presence of a soap solution, e.g., sodium stearate, an aqueous catalyst solution, e.g., potassium persulfate, and a modifier, e.g., dodecyl mercaptan. At the desired degree of conversion a shortstop such as hydroquinone is added to terminate the copolymerization. The unreacted monomers are recovered in flashing and steam stripping steps, and then an antioxidant such as phenyl-beta-naphthylamine can be added to the emulsion. The addition of brine to the emulsion tends to increase the polymer particles, and this step is known as creaming. Poly(ethylene oxide) added at this stage or before this point in a coagulating quantity will serve to coagulate the polymeric dispersion. Up to 2.5 weight percent, and higher, based on the weight of polymeric material, of poly(ethylene oxide) is suitable for this purpose. As little as 0.1 weight percent poly(ethylene oxide), and lower, based on the weight of polymeric material, is effective as a coagulant.

Illustrative recipes which can be employed to prepare synthetic latices amenable to being coagulated by the practice of this invention are as follows:

RECIPE II

| | Parts by weight [1] |
|---|---|
| Butadiene | 72 |
| Styrene | 28 |
| Dodecyl mercaptan | 0.6 |
| Potassium persulfate | 0.3 |
| Soap | 4.0 |
| Water | 182 |
| Shortstop: | |
|    Hydroquinone | 0.8 |
|    Water | 3.0 |

[1] Based on 100 parts of total monomers.

RECIPE III

| | Parts by weight |
|---|---|
| Chloroprene [1] | 100 |
| Water | 160 |
| Sodium hydroxide | 0.75 |
| Potassium salt of naphthalene sulfonic acid-formaldehyde condensation product | 0.65 |
| Potassium persulfate | 0.6 |

[1] Contains about 5 parts of N wood rosin and sulfur dissolved in the chloroprene.

RECIPE IV

| | Parts by weight |
|---|---|
| Butadiene | 74 |
| Acrylonitrile | 24 |
| Soap | 5 |
| Tert.-dodecyl mercaptan | 0.5 |
| Potassium chloride | 0.28 |
| Sodium pyrophosphate | 0.1 |
| Ferric sulfate | 0.02 |
| Hydrogen peroxide [1] | 0.4 |
| Distilled water | 180 |

[1] 20 percent concentration.

It is to be understood, of course, that the instant invention is not to be construed as limited to the recipes illustrated above. The rubber art is well apprised of the numerous recipes employed in emulsion polymerization processes. It is also to be understood that the poly(ethylene oxide) can be added prior to, or after, the incorporation of the various compounding ingredients to coagulate the latex. The different compounding ingredients which can be employed are those which are conventional to the rubber art. The only limitation is that the choice of said compounding ingredients, if added prior to the addition of poly(ethylene oxide), be such that coagulation does not occur upon the addition of said ingredients. The compounding ingredients can comprise conventional fillers, accelerators, vulcanizers, antioxidants, plasticizers, pigments, and others.

Another embodiment of this invention is directed to improving the color characteristics of resins prepared via the emulsion polymerization route of acrylonitrile, vinyl chloride and the like; or mixtures of acrylonitrile, vinyl chloride, etc., with copolymerizable monomers such as vinyl acetate or other vinyl esters of aliphatic monocarboxylic acids; methyl methacrylate, ethyl methacrylate, methyl acrylate or other alkyl esters of methacrylic and acrylic acids; vinylidene chloride, methacrylonitrile, N-allyl ureas, 2-methallyl alcohol, and the like. The resultant fibers prepared from the previously exemplified list of resins oftentimes possess undesirable color which makes dyeing necessary in addition to affecting the dye affinity of these fibers. Consequently, it is apparent that the undyed synthetic fibers can be restricted from a range of applications.

A probable source of color in recovered and dried resins such as, for example, vinyl chloride/acrylonitrile copolymers and other acrylonitrile-containing copolymers, is the high temperature, e.g., 120° C. and higher, which is required in the conventional hardening step. The high temperature is necessary to fuse the fine coagulated particles of the emulsion in order to facilitate recovery through a system of continuous centrifugation and drying. Consequently, the use of poly(ethylene oxide) as a coagulant in those systems illustrated above results in at least four distinct advantages, namely (1) the hardening step can be effected at a lower temperature than is the case with conventional coagulants such as calcium chloride; (2) the color of the resulting resin or manufactured fiber is improved; (3) the dyeing characteristics of the spun fiber is not adversely affected by residual calcium salts or other inorganic salts contained therein; and (4) efficient recovery through a centrifuge with minimum loss of resin in the effluent from the resin.

When metal salts, such as calcium chloride, are used as coagulants, a hardening temperature of 115 to 150° C. is necessary for satisfactory recovery of the resin, because when the resin is hardened below about 115° C. the coagulation breaks down and the resin is too fine to be recoverable by centrifugation. An important consideration, also, is the fact that the small percentage of the metal salts that remain in the resin contributes markedly to the formation of undesirable color in the resin.

When employing poly(ethylene oxide) having a reduced viscosity of at least 1.0 and up to 75, and higher, as a coagulant, prior to the hardening step, it is desirable to add the poly(ethylene oxide) to the emulsion under constant agitation. The coagulation is preferably conducted at room temperature; however, higher and lower temperatures can be employed, if desired. The coagulation period can vary from a few minutes to one hour, and longer, e.g., from about 5 minutes to about 30 minutes. Lower temperatures can be employed in the hardening step when using the poly(ethylene oxide) coagulant than is the case with conventional coagulants such as calcium chloride. However, should one desire higher temperatures can be employed. In general, the hardening step can be effected at a temperature as low as 80° C., and lower, and as high as 150° C. by virtue of employing poly(ethylene oxide) in the coagulation step.

It should be noted that the above advantages likewise apply to the coagulation of terpolymer emulsions such as acrylonitrile-vinyl chloride-vinylidene chloride, vinyl chloride-acrylonitrile-styrene, vinyl chloride-acrylonitrile-ethyl acrylate, and others numerous in the patent literature.

The following examples are illustrative.

Example 1

In this example six different metal salts were employed to coagulate six separate samples of a vinyl chloride/acrylonitrile[1] emulsion. The emulsion contained approximately 22 weight percent solids, and each sample contained 50 grams of polymer therein. After the addition of the metal salts at room temperature, under agitation, for 15 minutes, the resulting coagulated samples were hardened at a temperature of about 100° C. for approximately 15 minutes. Each sample was subsequently filtered through a Buchner funnel containing a No. 41 Whatman filter paper (under vacuum filtration). The results and pertinent data are set out in Table 1 below.

TABLE I

| Metal salt | Weight percent [1] | Uncoagulated copolymer in Buchner effluent [2] | Weight percent copolymer of Buchner cake [3] |
|---|---|---|---|
| Aluminum chloride | 0.50 | 8 | 35 |
| Potassium aluminum sulfate | 0.50 | 79 | |
| Aluminum sulfate | 0.50 | 75 | |
| Sodium phosphate | 0.50 | 100 | 0 |
| Aluminum stearate | 0.50 | 20 | 34 |
| Calcium chloride | 0.50 | 4 | 43 |

[1] Based on weight of copolymer in sample.
[2] Weight percent of uncoagulated copolymer in filtrate.
[3] These figures designate the weight percent of copolymer, based on total weight of material comprising filter cake. The remaining portion of filter cake was, in essence, water.

It is pointed out that the filter cake on the Buchner funnel should contain more than about 50 weight percent copolymer, based on the total weight of the filter cake, in order that centrifugation may be employed. It is apparent from the above runs that none of the metal salt coagulants were suitable for this purpose under the hardening temperature used.

Example 2

The same vinyl chloride/acrylonitrile emulsion employed in Example 1 was employed in the following runs. To five samples each containing 50 grams of copolymer, various organic coagulants were added. The coagulation step was conducted at room temperature, under agitation, for a period of 15 minutes. The coagulated samples were hardened at 100° C. for approximately 15 minutes with the exception of the sample hardened with acetone. In the case of acetone the hardening temperature was about 70° C. These samples were then filtered through a Buchner funnel containing a No. 41 Whatman filter

---

[1] Prepared by the emulsion polymerization of vinyl chloride and acrylonitrile in the presence of potassium persulfate catalyst, "Aerosol MA" surfactant, ferrous sulfate activator, and water. After the water and the mentioned ingredients were charged to the autoclave, the addition of the monomers, acrylonitrile and vinyl chloride from a monomers mix tank was started, and the autoclave was heated to the temperature of polymerization, 45° C. The monomers were added continuously in apropriate proportions to maintain a composition of 60 weight percent vinyl chloride and 40 weight percent acrylonitrile in the copolymer product. A polymerization promoter, sodium bisulfate, was metered into the autoclave continuously as the monomers were added. The polymerization was continued at 45° C. until the concentration of contained resin was approximately 22 weight percent, after which the monomers feed was stopped and the emulsion was stripped essentially free of unreacted monomers.

paper in the same manner as Example 1 above. The results and pertinent data are set out in Table II below.

TABLE II

| Organic Coagulant | Weight percent [1] | Uncoagulated copolymer in Buchner effluent [2] | Weight percent copolymer of Buchner cake [3] |
|---|---|---|---|
| Ethylene glycol diethyl ether | 200 | 4 | 39 |
| Polyethylene glycol [4] | >500 | 100 | 0 |
| Do.[5] | 3 | 45 | 30 |
| Methyl isobutyl ketone | >400 | 100 | 0 |
| Acetone | 400 | 5 | 47 |

[1] Based on weight of copolymer in sample.
[2] Weight percent of uncoagulated copolymer filtrate.
[3] These figures designate the weight percent of copolymer, based on total weight of material comprising filter cake. The remaining portion of filter cake was, in essence, water.
[4] Polyethylene glycol of average molecular weight of 300.
[5] Polyethylene glycol of average molecular weight of 6,000.

As stated in Example 1 previously, the filter cake should contain above about 50 weight percent of copolymer, based on the total weight of the filter cake, for separation via centrifugation to be feasible. It is pointed out that the filter cake comprised but 47 weight percent of copolymer, based on the total weight of the filter cake, when employing 400 weight percent acetone (based on copolymer weight) during the hardening step.

*Example 3*

In this example the effect of varying the agitation during the coagulation step on four samples of the emulsion employed in Example 1 above was noted. Each sample contained 50 grams of copolymer. Each sample was coagulated in a 3-liter stainless steel beaker with agitation being effected by means of a three-inch two-blade propeller at 300 r.p.m. or 600 r.p.m. at room temperature for a period of about 15 minutes. The coagulants employed were calcium chloride and poly(ethylene oxide) having a 1.0 weight percent aqueous bulk viscosity at room temperature of 7,000 c.p.s. Each sample was subsequently hardened at 100° C. for about 15 minutes. The results and pertinent data are set out in Table III below.

TABLE III

| Coagulant | Weight percent [1] | Agitator speed, r.p.m. | Uncoagulated copolymer in Buchner effluent [2] | Weight percent copolymer of Buchner cake [3] |
|---|---|---|---|---|
| Poly(ethylene oxide) | 0.5 | 300 | Nil | 65 |
| Do | 0.5 | 600 | Nil | 40 |
| Calcium chloride | 0.5 | 300 | 5.0 | 41 |
| Do | 0.5 | 600 | ([4]) | 30 |

[1] Based on weight of copolymer in sample.
[2] Weight percent of uncoagulated copolymer in filtrate.
[3] These figures designate the weight percent of copolymer, based on total weight of material comprising filter cake. The remaining portion of filter cake was, in essence, water.
[4] Not determined.

It will be noted from the data in Table III that poly(ethylene oxide) is a more effective coagulant than the widely used calcium chloride coagulant under the equivalent operative conditions employed, e.g., proportions, temperature and agitation.

*Example 4*

Sixteen runs were conducted on samples of the emulsion described in Example 1 previously. Each sample contained 500 grams of emulsion containing about 22 weight percent solids except run 5 which contained 11 weight percent solids. In run 5, after the coagulation step but prior to the hardening step, the coagulated medium was diluted to 11 weight percent solids by the addition of water. Agitation during the coagulation step was effected by means of a three-inch two-blade propeller at 300 r.p.m. at room temperature for a period of about 20 minutes. The hardening procedure was conducted at 100° C. for about 10 minutes with the exception of run 3 which was conducted at 120° C. The color of the dried hardened resin is indicated by "Co". The color value is the concentration, as measured by light transmission, of color bodies present in a stabilized acetone solution of the resin. A change from 100 to 90 percent transmission is arbitrarily established as one concentration unit. The lower this value, the better the color characteristic of the resin. The results and pertinent data are set forth in Table IV below.

TABLE IV

| Run | Coagulant Type | Weight percent [1] | Copolymer after hardening Uncoagulated copolymer in Buchner effluent [2] | Weights percent copolymer of Buchner cake [3] | Co |
|---|---|---|---|---|---|
| 1 | ([4]) | 0.50 | Nil | 65 | 1.5 |
| 2 | CaCl₂ | 0.50 | 4.0 | 43 | 1.6 |
| 3 | CaCl₂ | 0.50 | 3.5 | 48 | 2.6 |
| 4 | ([4]) | 0.50 | Nil | 64 | 1.5 |
| 5 | ([4]) | 0.50 | Nil | 64 | 1.6 |
| 6 | ([4]) | 0.25 | 2.0 | 65 | 1.6 |
| 7 | ([4]) | 0.75 | Nil | 64 | 1.5 |
| 8 | ([4]) | 1.00 | Nil | 64 | 1.5 |
| 9 | ([4]) | 1.50 | Nil | 60 | 1.5 |
| 10 | ([5]) | 0.50 | Nil | 62 | 1.6 |
| 11 | ([6]) | 0.50 | Nil | 64 | 1.5 |
| 12 | ([7]) | 0.50 | Nil | 56 | 1.6 |
| 13 | ([8]) | 0.50 | Nil | 51 | 1.6 |
| 14 | CaCl₂ | 0.50 | 4.8 | 41 | 1.5 |
| 15 | CaCl₂ | 0.50 | 4.6 | 38 | 1.6 |
| 16 | CaCl₂ | 1.00 | 4.3 | 33 | 1.6 |

[1] Based on weight of copolymer in sample.
[2] Weight percent of uncoagulated copolymer in filtrate.
[3] These figures designate the weight percent of copolymer, based on total weight of material comprising filter cake. The remaining portion of filter cake was, in essence, water.
[4] Poly(ethylene oxide) having a 1.0 weight percent aqueous bulk viscosity of 7,000.
[5] Poly(ethylene oxide) having a 1.0 weight percent aqueous bulk viscosity of 4,000.
[6] Poly(ethylene oxide) having a 1.0 weight percent aqueous bulk viscosity of 1,200.
[7] Poly(ethylene oxide) having a 1.0 weight percent aqueous bulk viscosity of 1,000.
[8] Poly(ethylene oxide) having a 1.0 weight percent aqueous bulk viscosity of 1,000.

The very favorable results obtained by using poly(ethylene oxide) are evident from the data in Table IV above.

*Example 5*

The same procedure of Example 1 above was followed except that a polyvinyl chloride emulsion of 10 weight percent solids was employed. The polyvinyl chloride emulsion was coagulated with 0.5 weight percent, based on the total solids of the emulsion, of poly(ethylene oxide) having a 1.0 weight percent aqueous bulk viscosity of 7,000 centipoises. The total solids content of the coagulated and hardened polyvinyl chloride resin immediately after filtration through the No. 41 filter paper in the Buchner funnel was 49 weight percent, based on the total weight of the filter cake.

*Example 6*

An emulsion of acrylonitrile-vinyl chloride-vinylidene chloride terpolymer was prepared from the following recipe:

| Charge | Parts by weight | |
|---|---|---|
| | Initial | Added |
| Deionized water | 286 | 48 |
| Acrylonitrile | 0 | 70 |
| Vinyl chloride | 0 | 20 |
| Vinylidene chloride | 0 | 10 |
| "Aerosol OT" | 0 | 0.72 |
| "Tergitol 4" | 0 | 0.70 |
| Sodium bisulfide | 0.001 | 0.24 |
| Potassium persulfate | 0 | 0.21 |
| Mixed t-mercaptans | 0 | 0.37 |

The approximate composition of the terpolymer was as follows: 65 weight percent acrylonitrile, 23 weight percent vinyl chloride, and 12 weight percent vinylidene chloride. The solids content of the emulsion was 21 weight percent.

This emulsion was subjected to the procedure outlined in Example 1 previously. Coagulation was effected with 0.5 weight percent, based on the total solids content of the emulsion, of poly(ethylene oxide) having a 1.0 weight percent aqueous bulk viscosity of 7000 centipoises. The hardening step was effected at 100° C. The total solids content of the filter cake of the coagulated and hardened terpolymer was 49 weight percent, based on the total weight of said filter cake. When using an equivalent weight of calcium chloride as the coagulant and effecting the hardening step at a temperature of 120° C., the solids content of the filter cake was 47 weight percent.

In Examples 7 through 17 to follow, the poly(ethylene oxide) was employed as a 1.0 weight percent aqueous solution. The aqueous bulk viscosity was 4600 centipoises. The polymer was prepared by the suspension polymerization of ethylene oxide in the presence of ethylene oxide modified calcium amide catalyst and heptane as the inert organic medium. In these examples the poly(ethylene oxide) was added at room temperature, i.e., about 24° C. Where indicated, the monomers comprising the copolymers are in weight percent, based on the total copolymer weight.

*Example 7*

To an emulsion containing 25 weight percent solids, based on the total emulsion weight, of 75 vinyl chloride/25 vinyl butyl ether copolymer, having a pH of approximately 7, there was added 0.5 weight percent poly(ethylene oxide), based on the solids weight. A pliable rubbery mass immediately formed. Upon raising the temperature to 100° C., under agitation, the rubbery mass broke down into fine discrete particles which were recoverable by centrifugation or filtration or decantation.

*Example 8*

To an emulsion containing 53.1 weight percent solids, based on the total emulsion weight, of a butadiene/acrylonitrile copolymer having a pH of approximately 8, there was added 0.5 weight percent poly(ethylene oxide), based on the solids weight. A pliable rubbery mass immediately formed. Upon raising the temperature to 100° C., under agitation, the rubbery mass broke down into fine, discrete particles which were recoverable by centrifugation or filtration or decantation.

*Example 9*

To a polychloroprene emulsion containing 50 weight percent solids therein and having a pH of approximately 10, there was added 0.5 weight percent poly(ethylene oxide), based on the weight of polychloroprene. Almost immediately there was observed the formation of a pliable rubbery mass. Upon raising the temperature to 100° C., under agitation, the rubbery mass broke down into fine discrete particles which were recoverable by centrifugation or filtration or decantation. Upon cooling to 5° C. these fine discrete particles fused together and formed rubbery solids resembling popcorn polymer in form.

*Example 10*

A natural rubber latex containing 62 weight percent solids and having a pH of about 10 was substantially deammoniated by heating to approximately 75° C. for about 30 minutes. The pH of the resulting deammoniated emulsion was approximately 7.5. To the resulting deammoniated latex there was added 0.5 weight percent poly(ethylene oxide), based on the weight of the solids content of said emulsion without coagulation being effected. Upon heating to approximately 75° C. for a period of 15 to 30 minutes a pliable rubbery mass was formed which could be compounded with conventional compounding ingredients in a Marshall Mill.

*Example 11*

To a butadiene/styrene latex containing 42 weight percent solids and having a pH of about 8, there was added 0.5 weight percent poly(ethylene oxide), based on the total solids of said latex. A pliable rubbery mass formed almost instantaneously on the addition of said poly(ethylene oxide).

*Example 12*

In this example a polystyrene latex containing 40 weight percent solids and having a pH of approximately 6 was employed. Upon the addition of 0.5 weight percent poly(ethylene oxide), based on the solids weight of said latex, a soft pliable mass was immediately formed. This rubbery mass could be readily compounded with conventional compounding ingredients in a Marshall Mill.

*Example 13*

To an emulsion containing 48 weight percent solids, based on the total emulsion weight, of 55 styrene/45 butadiene copolymer, having a pH of approximately 7, there was added 0.5 weight percent poly(ethylene oxide), based on the solids weight. A pliable rubbery mass formed almost immediately upon the addition of said poly(ethylene oxide). Upon heating up to 100° C., under agitation, this rubbery mass broke down into fine, soft, discrete particles.

*Example 14*

In this example an emulsion of a butadiene/acrylonitrile copolymer having a solids content of 40 weight percent and a pH of approximately 6 was employed. To this emulsion 0.5 weight percent poly(ethylene oxide), based on the solids weight of said emulsion, was added. A pliable rubbery mass formed almost immediately upon the addition of said poly(ethylene oxide), and upon heating the contents containing this rubbery mass up to a temperature of 100° C., under agitation, it was observed that the rubbery mass broke down into fine, soft, discrete particles.

*Example 15*

To a butadiene/acrylonitrile latex having a total solids content of 40 weight percent and a pH of approximately 8, there was added 0.5 weight percent poly(ethylene oxide), based on the solids content of said latex. It was observed that a pliable rubbery mass formed almost immediately upon the addition of said poly(ethylene oxide). Upon heating the contents containing this rubbery mass up to a temperature of approximately 100° C., under agitation, it was observed that said rubbery mass broke down into stringy particles.

*Example 16*

To a butadiene/styrene latex having a total solids content of 60 weight percent and a pH of approximately 10, there was added 0.5 weight percent poly(ethylene oxide), based on said solids content of said latex. It was observed that a pliable rubbery mass formed on the addition of said poly(ethylene oxide) which when heated up to a temperature of 100° C., under agitation, broke down into fine, soft, discrete particles. Upon cooling the contents comprising these discrete particles to approximately 5° C. it was observed that the particles were recoverable in a Buchner funnel.

*Example 17*

To a Hycar 1561 latex having a total solids content of 40.7 weight percent and a pH of approximately 8, there was added 0.5 weight percent poly(ethylene oxide) based on the solids content of said latex. Upon the addition of said poly(ethylene oxide) a pliable rubbery mass was formed which when heated up to approximately 100° C., under agitation, broken down into fine, soft, discrete particles.

It is obvious that various ramifications and modifications of the instant invention can be made in the light of the instant disclosure.

What is claimed is:

1. A method of coagulating a liquid suspension of coagulable polymeric organic material, said polymeric organic material being derived from the polymerization of at least one ethylenically unsaturated monomer, which comprises adding to said liquid suspension a coagulating amount of poly(ethylene oxide) which has a reduced viscosity value of at least 1.0 as measured at a concentration of 0.2 gram of said poly(ethylene oxide) in 100 milliliters of acetonitrile at 30° C.

2. A method of soagulating a coagulable aqueous dispersion of polymeric organic material, said polymeric organic material being derived from the polymerization of at least one ethylenically unsaturated monomer, which comprises admixing with said dispersion of coagulating amount of poly(ethylene oxide) which has a reduced viscosity value of at least 1.0 as measured at a concentration of 0.2 gram of said poly(ethylene oxide) in 100 milliliters of acetonitrile at 30° C..

3. The method of claim 2 wherein said coagulable aqueous dispersion of polymeric organic materal is an emulsion comprising butadiene/styrene copolymers.

4. The method of claim 2 wherein said coagulable aqueous dispersion of polymeric organic material is an emulsion comprising butadiene/acrylonitrile copolymers.

5. The method of claim 2 wherein said coagulable aqueous dispersion of polymeric organic material is an emulsion comprising acrylonitrile/vinyl chloride copolymers.

6. A method of coagulating a synthetic latex emulsion derived from the polymerization of an admixture of at least two ethylenically unsaturated monomers, said latex emulsion being useful for the manufacture of fibers which comprises coagulating said latex emulsion by adding thereto a coagulating amount of poly(ethylene oxide) having a reduced viscosity value of at least 1.0 as measured at a concentration of 0.2 gram of said poly(ethylene oxide) in 100 milliliters of acetonitrile at 30° C., and subsequently subjecting the coagulated system to a hardening step.

7. The method of claim 6 wherein said synthetic latex emulsion comprises an emulsion of coagulable copolymers.

8. The method of claim 7 wherein said latex emulsion comprises an emulsion of acrylonitrile/vinyl chloride copolymers.

9. The method of claim 6 wherein said synthetic latex emulsion comprises an emulsion of coagulable terpolymers.

10. The method of claim 9 wherein said latex emulsion comprises an emulsion of acrylonitrile/vinyl chloride/vinylidene chloride terpolymers.

11. A composition comprising a aqueous dispersion of coagulable polymeric organic material, said polymeric organic material being derived from the polymerization of at least one ethylenically unsaturated monomer, and poly(ethylene oxide) which has a reduced viscosity value of at least 1.0 as measured at a concentration of 0.2 gram of said poly(ethylene oxide) in 100 milliliters of acetonitrile at 30° C., in an amount sufficient to coagulate said composition at elevated temperatures.

12. A composition comprising a natural rubber latex and poly(ethylene oxide) which has a reduced viscosity value of at least 1.0 as measured at a concentration of 0.2 gram of said poly(ethylene oxide) in 100 milliliters of acetonitrile at 30° C., in an amount sufficient to coagulate said composition at elevated temperatures.

13. A rubber latex composition adaptable for the manufacture of rubber articles by coagulation at elevated temperatures containing a heat-sensitizing amount of poly(ethylene oxide) having a reduced viscosity value of at least 1.0 as measured at a concentration of 0.2 gram of said poly(ethylene oxide) in 100 milliliters of acetonitrile at 30° C.

References Cited in the file of this patent

UNITED STATES PATENTS

| | | |
|---|---|---|
| 2,598,127 | Keckler | May 27, 1952 |
| 2,706,182 | Pruitt et al. | Apr. 12, 1955 |
| 2,791,567 | Lowe et al. | May 7, 1957 |
| 2,866,761 | Hill et al. | Dec. 30, 1958 |
| 2,870,101 | Stewart | Jan. 20, 1959 |

FOREIGN PATENTS

| | | |
|---|---|---|
| 470,181 | Great Britain | Aug. 3, 1937 |
| 624,917 | Great Britain | June 17, 1949 |